US007072315B1

(12) United States Patent
Liu et al.

(10) Patent No.: US 7,072,315 B1
(45) Date of Patent: Jul. 4, 2006

(54) MEDIUM ACCESS CONTROL FOR ORTHOGONAL FREQUENCY-DIVISION MULTIPLE-ACCESS (OFDMA) CELLULAR NETWORKS

(75) Inventors: Hui Liu, Sammamish, WA (US); Xiaodong Li, Bellevue, WA (US); Fuqi Mu, Issaquah, WA (US)

(73) Assignee: Adaptix, Inc., Seattle, WA (US)

( * ) Notice: Subject to any disclaimer, the term of this patent is extended or adjusted under 35 U.S.C. 154(b) by 944 days.

(21) Appl. No.: 09/685,977

(22) Filed: Oct. 10, 2000

(51) Int. Cl.
H04Q 7/00 (2006.01)
H04J 11/00 (2006.01)
H04B 11/00 (2006.01)

(52) U.S. Cl. ............ 370/329; 370/208; 455/450; 455/69

(58) Field of Classification Search ........ 370/203–210, 370/329, 341, 348, 332; 375/147, 148, 260, 375/264, 346, 348; 455/449–452.2, 463–464, 455/561, 69, 63.1, 67.13, 509, 512, 513
See application file for complete search history.

(56) References Cited

U.S. PATENT DOCUMENTS

| 5,038,399 | A | * | 8/1991 | Bruckert ............... 455/452.2 |
|---|---|---|---|---|
| 5,479,447 | A | | 12/1995 | Chow et al. |
| 5,504,775 | A | | 4/1996 | Chouly et al. |
| 5,515,378 | A | | 5/1996 | Roy, III et al. |
| 5,555,268 | A | | 9/1996 | Fattouche et al. |
| 5,708,973 | A | | 1/1998 | Ritter |
| 5,726,978 | A | | 3/1998 | Frodigh et al. |
| 5,734,967 | A | | 3/1998 | Kotzin et al. |
| 5,886,988 | A | | 3/1999 | Yun et al. |
| 5,887,245 | A | | 3/1999 | Lindroth et al. |
| 5,914,933 | A | | 6/1999 | Cimini et al. |
| 5,933,421 | A | * | 8/1999 | Alamouti et al. ........... 370/203 |
| 5,956,642 | A | * | 9/1999 | Larsson et al. ............. 455/449 |
| 5,973,642 | A | | 10/1999 | Li et al. |
| 5,991,273 | A | | 11/1999 | Abu-Dayya |
| 6,005,876 | A | | 12/1999 | Cimini, Jr. et al. |
| 6,026,123 | A | | 2/2000 | Williams |
| 6,041,237 | A | | 3/2000 | Farsakh |
| 6,052,594 | A | * | 4/2000 | Chuang et al. ............. 455/450 |
| 6,061,568 | A | | 5/2000 | Dent |
| 6,064,692 | A | | 5/2000 | Chow |
| 6,064,694 | A | | 5/2000 | Clark et al. |
| 6,067,290 | A | | 5/2000 | Paulraj et al. |
| 6,091,717 | A | | 7/2000 | Honkasalo et al. |
| 6,108,374 | A | | 8/2000 | Balachandran et al. |
| 6,119,011 | A | * | 9/2000 | Borst et al. ................. 370/329 |
| 6,131,016 | A | | 10/2000 | Greenstein et al. |
| 6,144,696 | A | | 11/2000 | Shively et al. |
| 6,226,320 | B1 | | 5/2001 | Hakkinen et al. |

(Continued)

FOREIGN PATENT DOCUMENTS

DE      198 00 953 C1      7/1999

(Continued)

OTHER PUBLICATIONS

Bender et al., CDMA/HDR: A Bandwidth-Efficient High-Speed Wireless Data Service for Nomadic Users, IEEE Communications Magazine, Jul. 2000, pp. 70-87.

(Continued)

Primary Examiner—Steven Nguyen
(74) Attorney, Agent, or Firm—Fulbright & Jaworski LLP

(57) ABSTRACT

A method and apparatus for controlling OFDMA cellular networks is described. In one embodiment, the method comprises receiving channel characteristics and noise-plus-interference information measured at spatially distributed subscribers and assigning traffic channels for an orthogonal frequency-division multiple-access (OFDMA) network.

35 Claims, 9 Drawing Sheets

U.S. PATENT DOCUMENTS

| | | | |
|---|---|---|---|
| 6,298,092 B1 * | 10/2001 | Heath et al. | 455/69 |
| 6,366,195 B1 | 4/2002 | Harel et al. | |
| 6,377,632 B1 | 4/2002 | Paulraj et al. | |
| 6,442,130 B1 * | 8/2002 | Jones et al. | 370/208 |
| 6,445,916 B1 * | 9/2002 | Rahman | 455/423 |
| 6,477,158 B1 | 11/2002 | Take | |
| 6,487,253 B1 * | 11/2002 | Jones et al. | 375/260 |
| 6,600,776 B1 * | 7/2003 | Alamouti et al. | 375/147 |
| 6,633,614 B1 * | 10/2003 | Barton et al. | 375/264 |
| 6,922,445 B1 * | 7/2005 | Sampath et al. | 375/267 |
| 2003/0067890 A1 | 4/2003 | Goel et al. | |
| 2003/0169824 A1 | 9/2003 | Chayat | |

FOREIGN PATENT DOCUMENTS

| | | |
|---|---|---|
| EP | 0 869 647 A2 | 10/1998 |
| EP | 0 926 912 A2 | 6/1999 |
| EP | 0 929 202 A1 | 7/1999 |
| FR | 2 777 407 A1 | 10/1999 |
| GB | 2 209 858 A | 8/1997 |
| JP | 06029922 | 2/1994 |
| WO | WO 97/01256 | 1/1997 |
| WO | WO 98/16077 A2 | 4/1998 |
| WO | WO 98/30047 A1 | 7/1998 |
| WO | WO 02 49305 A2 | 6/2002 |

OTHER PUBLICATIONS

Frullone et al., PRMA Performance in Cellular Environments with Self-Adaptive Channel Allocation Strategies, IEEE Transactions on Vehicular Technology, Nov. 1996, pp. 657-665 vol. 45, No. 4.

Xu, Guanghan and Li, San-Qi, Throughput Multiplication of Wireless Lans for Multimedia Sevices: SDMA Protocol Design, 1994 IEEE, pp. 1326-1332.

Ward, James and Compton, R. Ted, Jr., High Throughput Slotted ALOHA Packet Radio Networks with Adaptive Arrays, IEEE Transactions on Communications, Mar. 1993, pp. 460-470, vol. 41, No. 3.

Tsoulos, G.V., Smart antennas for mobile communication systems: benefits and challenges, Electronics & Communication Engineering Journal, Apr. 1999, pp. 84-94.

Shad et al., Indoor SDMA Capacity Using a Smart Antenna Basestation, 1997 IEEE, pp. 868-872.

Farsakh, Christof and Nossek, Josef A., On the Mobile Radio Capacity Increase Through SDMA, no date (after 1997).

Farsakh, C. et al., "Maximizing the SDMA Mobile Radio Capacity Increase by DOA Sensitive Channel Allocation", Wireless Personal Communications, Kluwer Academic Publishers, NL, vol. 11, No. 1, Oct. 1999, pp. 63-76, XP000835062, ISSN: 0929-6212.

Wong, C.Y., et al., *Multiuser OFDM With Adaptive Subcarrier, Bit, and Power Allocation,* IEEE Journal on Selected Areas in Communications, Oct. 1999, IEEE Inc., New York, USA, vol. 17, Nr. 10, pp. 1747-1758, XP000854075, ISSN: 0733-8716 Sections I and II abstract.

Gruenheid, R. et al: "Adaptive Modulation and Multiple Access for the OFDM Transmission Technique", Wireless Personal Communications, Kluwer Academic Publishers, NL, vol. 13, NR. 1/2, Year 2000, pp. 5-13 XP000894156, ISSN: 0929-6212.

Motegi, M. et al.: "Optimum Band Allocation According to Subband Condition for BST-OFDM" 11th IEEE International Symposium on Personal Indoor and Mobile Radio Communications, vol. 2, Sep. 18-21, 2000, pp. 1236-1240, XP002213669, Piscataway, NJ, USA, ISBN: 0-7803-6463-5.

Kapoor, S. et al.: "Adaptive Interference Suppression in Multiuser Wireless OFDM Systems Using Antenna Arrays" IEEE Transactions on Signal Processing, vol. 47, No. 12, Dec. 1999, pp. 3381-3391, XP000935422, IEEE, New York, USA, ISSN: 1053-587X.

Ye Li, et al.: "Clustered OFDM with channel estimation for high rate wireless data", Mobile Multimedia Communications, 1999. (MOMUC '99). 1999 IEEE International Workshop on San Diego, CA, USA, IEEE, US, Nov. 15, 1999, pp. 43-50, XP010370695, ISBN: 0-7803-5904-6.

Nogueroles, R. et al.: "Improved Performance of a Random OFDMA Mobile Communication System" Vehicular Technology Conference, 1998. VTC 98. 48th IEEE Ottawa, Ontario, Canada, May 18-21, 1998, pp. 2502-2506, XP010288120, ISBN: 0-7803-4320-4.

Kinugawa, Y. et al.: "Frequency and Time Division Multiple Access with Demand-Assignment Using Multicarrier Modulation for Indoor Wireless Communications Systems", IEICE Transactions on Communications, Institute of Electonics Information and Comm. Eng. Tokyo, Japan, vol. E77-B, NR. 3, Mar. 1994, pp. 396-402, XP000451014, ISSN: 0916-8516.

PCT Written Opinion mailed Sep. 18, 2003, International Application No. PCT/US01/31766 (5 pages).

Chinese Office Action issued for 01817199.0 dated Apr. 22, 2005.

* cited by examiner

MEDIUM ACCESS CONTROL FOR ORTHOGONAL FREQUENCY-DIVISION MULTIPLE-ACCESS (OFDMA) CELLULAR NETWORKS

FIELD OF THE INVENTION

The present invention relates to the field of cellular networks; more particularly, the present invention relates to using medium access control for orthogonal frequency-division multiple-access (OFDMA) cellular networks.

BACKGROUND OF THE INVENTION

With high-speed wireless services increasingly in demand, there is a need for more throughput per bandwidth to accommodate more subscribers with higher data rates while retaining a guaranteed quality of service (QoS). In point-to-point communications, the achievable data rate between a transmitter and a receiver is constrained by the available bandwidth, propagation channel conditions, as well as the noise-plus-interference levels at the receiver. For wireless networks where a base-station communicates with multiple subscribers, the network capacity also depends on the way the spectral resource is partitioned and the channel conditions and noise-plus-interference levels of all subscribers. In current state-of-the-art, multiple-access protocols, e.g., time-division multiple access (TDMA), frequency-division multiple-access (FDMA), code-division multiple-access (CDMA), are used to distribute the available spectrum among subscribers according to subscribers' data rate requirements. Other critical limiting factors, such as the channel fading conditions, interference levels, and QoS requirements, are ignored in general.

Recently, there is an increasing interest in orthogonal frequency-division multiplexing (OFDM) based frequency division multiple access (OFDMA) wireless networks. One of the biggest advantages of an OFDM modem is the ability to allocate power and rate optimally among narrowband sub-carriers. From a theoretical standpoint, OFDM was known to closely approximate the "water-filling" solutions of information theory that are capacity achieving. Some early work of Hirosaki, "An Orthogonally Multiplexed QAM System Using the Discrete Fourier Transform," IEEE Trans. Communications, vol. 29, July 1981, pp. 982–989, based on an FFT implementation of OFDM achieved complexity and decoded bit count that was comparable to single-carrier counterparts. This inherent potential of OFDM achieved fruition in the design of discrete multi-tone systems (DMT) for xDSL/ADSL applications pioneered by J. Cioffi et al., "A discrete multi-tone transceiver system for HDSL applications," IEEE Journal on Selected Areas in Communications, vol. 9, no. 6 Aug. 1991, pp 909–91.

OFDMA allows for multi-access capability to serve increasing number of subscribers. In OFDMA, one or a cluster OFDM sub-carriers defines a "traffic channel", and different subscribers access to the base-station simultaneously by using different traffic channels. For more information, see Cheng and Verdu, "Gaussian multiaccess channels with ISI: Capacity region and multiuser water-filling," IEEE Trans. Info. Theory, Vol. 39(3), pp 773—785, May 1993; Tse and Hanly, "Multiaccess fading channels—part I: Polymatriod structure, optimal resource allocation and throughput capacities," IEEE Trans. Info. Theory, Vol. 44(7), pp 2796–2815, November 1998; and Wong et al., "Multiuser OFDM with adaptive subcarrier, bit and power allocation," IEEE J. Select. Areas Commun., Vol. 17(10), pp 1747–1758, October 1999. These references indicate that there is a problem for multi-user communications and show that a full extent of centralized resource allocation in the context of OFDMA can substantially increase the capacity of a wireless network.

Existing approaches for wireless traffic channel assignment are subscriber-initiated and single-subscriber (point-to-point) in nature. Since the total throughput of a multiple-access network depends on the channel fading profiles, noise-plus-interference levels, and in the case of spatially separately transceivers, the spatial channel characteristics, of all active subscribers, distributed or subscriber-based channel loading approaches as fundamentally sub-optimum. Furthermore, subscriber-initiated loading algorithms are problematic when multiple transceivers are employed as the base-station, since the signal-to-noise-plus-interference ratio (SINR) measured based on an omni-directional sounding signal does not reveal the actual quality of a particular traffic channel with spatial processing gain. In other words, a "bad" traffic channel measured at the subscriber based on the omni-directional sounding signal may very well be a "good" channel with proper spatial beamforming from the base-station. For these two reasons, innovative information exchange mechanisms and channel assignment and loading protocols that account for the (spatial) channel conditions of all accessing subscribers, as well as their QoS requirements, are highly desirable. Such "spatial-channel-and-QoS-aware" allocation schemes can considerably increase the spectral efficiency and hence data throughput in a given bandwidth. Thus, distributed approaches, i.e., subscriber-initiated assignment are thus fundamentally sub-optimum.

SUMMARY OF THE INVENTION

A method and apparatus for controlling OFDMA cellular networks is described. In one embodiment, the method comprises receiving channel characteristics and noise-plus-interference information measured at spatially distributed subscribers and assigning traffic channels for an orthogonal frequency-division multiple-access (OFDMA) network.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
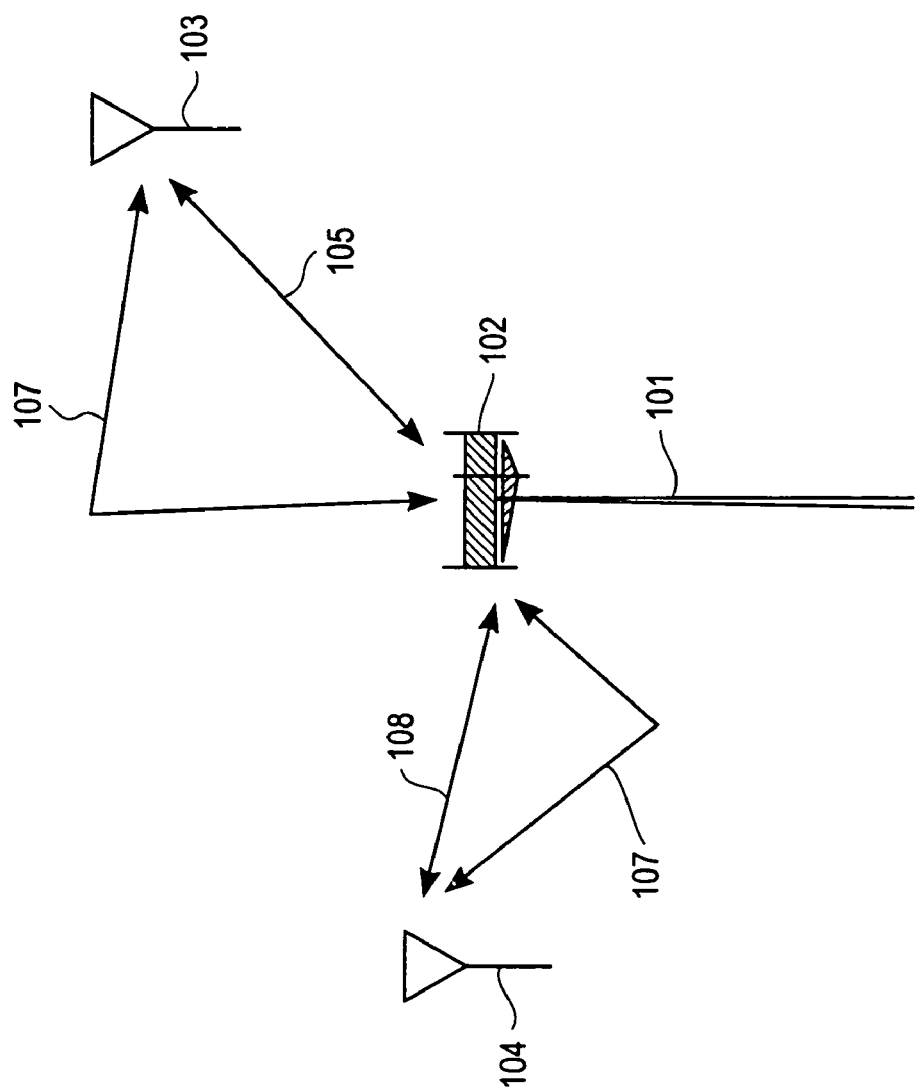
FIG. 1 is a block diagram of one embodiment of a multiple access wireless network with a base-station and multiple subscribers.

A protocol for allocating channels is described. In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A medium access control protocol is described that centralizes broadband channel characteristics and noise-plus-interference information measured at spatially distributed subscribers and assigns traffic channels for orthogonal frequency-division multiple-access (OFDMA) network. In one embodiment, the assignment is made using spatial multiplexing (beamforming).

In one embodiment, the medium access control protocol controls channel information feedback from multiple subscribers to the base-station, estimates spatial processing gains for both uplink (subscriber to base-station) and downlink (base-station to subscriber) communications, and performs joint traffic channel assignment.

In one embodiment, a base-station in a wireless network collects broadband channel and noise-plus-interference information measured at multiple subscribers, estimates space-time-frequency diversity gains afforded by spatially separated antennas at the base-station, determines the uplink and downlink OFDMA traffic channel conditions, and jointly assigns traffic channels to needed subscribers. The assignment may be made to substantially increase the network throughput.

In one embodiment, standby subscribers initially listen to an omni-directional sounding signal broadcast by a base-station in the cell network. The sounding signal may comprise a signal having a data sequence known to the base-station and the subscribers. Each subscriber estimates channel gains and noise-plus-interference levels of a set of OFDMA traffic channels. In one embodiment, the set of OFDMA traffic channels are different for different subscribers. When one or more subscribers are paged or when one or more subscribers have packets to transmit to the base-station, such subscribers transmit measured channel and noise-plus-interference information to the base-station through pre-allocated access channels. Those subscribers with links to the base-station already allocated need not resend their information unless the base-station is performing retraining (globally reallocating). The access channels are preallocated by the base station.

The base-station demodulates the access signals and estimates the broadband spatial processing gains across all available OFDMA traffic channels for each of the accessing subscribers (subscribers sending or desiring to send information to the base station). The results, together with the feedback channel and noise-plus-interference information, are used to determine the optimum set of uplink and downlink traffic channels for accessing and/or ongoing subscribers.

A subscriber unit that communicates with a base-station using OFDMA is also disclosed. In one embodiment, the subscriber unit includes a channel and noise-plus-interference estimator, an access signal generator, and an OFDM modem. The channel and noise-plus-interference estimator estimates channel gains and noise-plus-interference levels in a pre-determined set of traffic channels, possibly announced by the base-station. This information is the SINRs corresponding to the pre-determined set of traffic channels. The predetermined set of channels may comprise all the channels or some portion of channels. The portion of channels may be the even channels, odd channels, every ith channel (where i is an integer from 3 or above, such that the portion of channels comprises every $3^{rd}$ channel, or every $4^{th}$ channel, etc.), or a number of channels that are not selected from a regular pattern such as every ith channel.

The access signal generator encodes the channel and noise-plus-interference information to form an access signal. The OFDM modem modulates the access signal and transmits the modulated signal through an access channel. The access channel is comprised of all or a subset of traffic channels during an access time slot. The accessing signal from the subscriber is used by the base-station to perform spatial channel and spatial processing gain estimation for all or a subset of traffic channels and traffic channel assignment.

A base-station that communicates with multiple subscribers using OFDMA protocol is also disclosed. In one embodiment, the base-station includes one or more spatially separated transceivers, an access signal detector and demodulator, a broadband spatial channel and spatial gain estimator, an uplink and downlink signal-to-noise-plus-interference calculator, a multi-user traffic channel allocator, and an OFDM modem. The access signal detector and demodulator detects access signals transmitted from subscribers and demodulates the feedback channel gain and noise-plus-interference information measured at the subscribers. Based on the received accessing signals, the spatial channel and spatial gain estimator estimates the broadband spatial channel, i.e., the spatial characteristics of all or a subset of traffic channel, between the base-station and each of the accessing subscribers. The broadband spatial channel estimates, together with the measured channel and noise-plus-interference information feedback from the access subscribers, are used by the multi-user traffic channel allocator to determine a traffic channel assignment and code and modulation combination for each of the accessing subscribers.

The coding and modulation scheme may be selected based on the SINR values. For example, if SINR >=6 dB: QPSK with 1/2 coding, yielding 1 bit/sec/HZ if SINR >=12 dB: 16 QAM with 3/4 coding, yielding 3 bits/sec/HZ, where the fractional numbers refer to code rates (=# of information bits/# of coded bits). Therefore, 1/2 coding means that 1 information bit generates 2 coded bits, adding 100% redundancy. For example, if one wants to transmit 100 bits over wireless link, one first codes them (adding 100% redundancy) and generates 200 coded bits, then modulates the 200 bits using QPSK. At the receiver side, the decoder removes the redundancy and recovers the 100 information bits. The 3/4 coding simply means 3 information bits generates 4 coded bits (33% redundancy).

The OFDM modem modulates the decision regarding traffic channel assignments and code and modulation combinations and transmits the modulated decision to the subscribers. The modulated decision may comprise a channel index or channel indices for channels allocated to the subscriber or an indication of the same (e.g., a compressed version of a channel index, bit pattern indicative of the channel to be used or not to be used, etc.).

For the spatial channel and spatial gain estimator, a process for estimating uplink and downlink spatial gains from the access signals, in conjunction with the channel and noise-plus-interference information feedback from the subscribers, is disclosed. The process may be performed by processing logic that comprises hardware (e.g., dedicated logic), software (such as that which runs on a general purpose computer or on a dedicated machine), or a combination of both. In one embodiment, the process includes processing logic that first estimates the broadband spatial channels across all or a pre-specified set of OFDMA traffic channels for each accessing subscriber based on the accessing channel received. The results determine the uplink and downlink "spatial processing" gain on each of the OFDMA traffic channels. Processing logic adds the spatial processing gain to the downlink signal strength feedback (e.g., the channel and noise-plus-interference information) from the subscriber to predict the signal to noise-plus-interference ratio (SINR) for uplink and downlink transmission with spatial processing (e.g., beamforming) over each of the available OFDMA traffic channels. The available OFDMA traffic channels may comprise all the traffic channels or may comprise all or some portion of the unused traffic channels. Using the SINRs values for all active subscribers and accessing subscribers, processing logic determines a traffic channel assignment. In one embodiment, such a traffic channel assignment may be the optimum traffic channel assignment.

In another embodiment, the protocol for channel assignment incorporates priority (based on, for example, an amount of money paid by the subscriber) and QoS requirements. In one such embodiment, the base-station first estimates the uplink and downlink SINRs across all OFDMA traffic channels for all active (subscriber already linked to the base-station but not currently transmitting) and accessing subscribers, while factoring in the QoS requirements (e.g., data rate (e.g., buffer size), time-out, bit error rate, waiting time (how long the subscriber has been waiting)) to determine the optimum traffic channel allocation. Such information may be combined in a weighted fashion. For example, in one embodiment, a gain may be combined with weighted buffer size and time out requests.

In another embodiment, the protocol for channel assignment that involves multiple base-stations is disclosed. In such an embodiment, in a multi-cell environment, the base-station within each cell first estimates the uplink and downlink SINRs across all OFDMA traffic channels for all active and accessing subscribers. Each base-station may also buffer the QoS requirements (e.g., data rate, time-out, bit error rate, waiting time). Base-stations in neighboring cells exchange such information before performing a traffic channel allocation jointly for multiple subscribers.

Thus, the present invention may be used to answer a primary challenge for next generation wireless networks by supporting integrated multimedia type traffic over a unified network platform. Also, given the stringent constraints on bandwidth, power and cost relative to increasing end-user expectations, design optimization approaches described herein for the air interface (involving multiple access/modem issues) exploit space-time-frequency resources and yet provide a feasible low-cost/low-power solution to mobility support is a critical imperative.

OFDMA with Multi-User Uploading

Orthogonal frequency-division multiplexing (OFDM) is a form of modulation that transmits high-speed data via multiple parallel traffic channels. In broadband applications where the communication channels are frequency selective, OFDM is known to closely approximate the "water-filling" solutions of information theory that are capacity-achieving via appropriate power-per-bit allocations to each sub-carrier.

For wireless systems with multiple subscribers, many existing schemes combine OFDM with static time-division multiple access (TDMA), and handle multiple-access by letting users communicate with the base-station in separate time slot(s). Within each time slot, OFDM with water-filling can be employed to maximize the capacity. While the OFDM/TDMA scheme offers a capacity increase over the conventional TDMA scheme with fixed modulation, channel adaptation here is limited to single-user loading. Notice that in point-to-point OFDM, narrowband traffic channels (subcarriers) that experience deep fade are wasted because they are not power-efficient to carry any information bit. However in a multiple-access environment, this portion of subcarriers is unlikely to be in deep fade for all users. FIG. 1 illustrates broadband channel fading patterns that are dramatically different from one subscriber to the other. From a theoretical viewpoint, an orthogonal frequency-division multiple access (OFDMA) that allows simultaneous data transmission from multiple subscribers over different traffic channels can offer a substantially larger capacity increase over OFDM/TDMA. To achieve such gain however, coordination between the base-station and subscribers is of paramount importance.

Protocols for Centralized Channel Assignment

In one embodiment, the broadband channel characteristics of each subscriber, as well as the noise-plus-interference experienced across all OFDMA traffic channels, are known to the base-station for joint uplink and downlink traffic channel allocation. Secondly, if the spatial diversity afforded by base-station antenna array is to be exploited at the base-station, as done in almost all wireless networks, an additional information exchange is required to estimate the downlink channel characteristics associated with each subscriber. This is because before a wireless link is established, only sounding signals transmitted omni-directional from the base-station can be detected by stand by subscribers. Channel characteristics or signal strengths estimated at the subscriber based on the sounding signals do not reflect the actual downlink channel conditions after spatial processing is applied. Thirdly, each subscriber is subject to interference from neighboring cells in a multi-cell setup. To increase, and potentially maximize, the spectral efficiency for ever-changing traffic, coordination among base-stations and subscribers is considered in traffic channel assignment.

Figure 2:
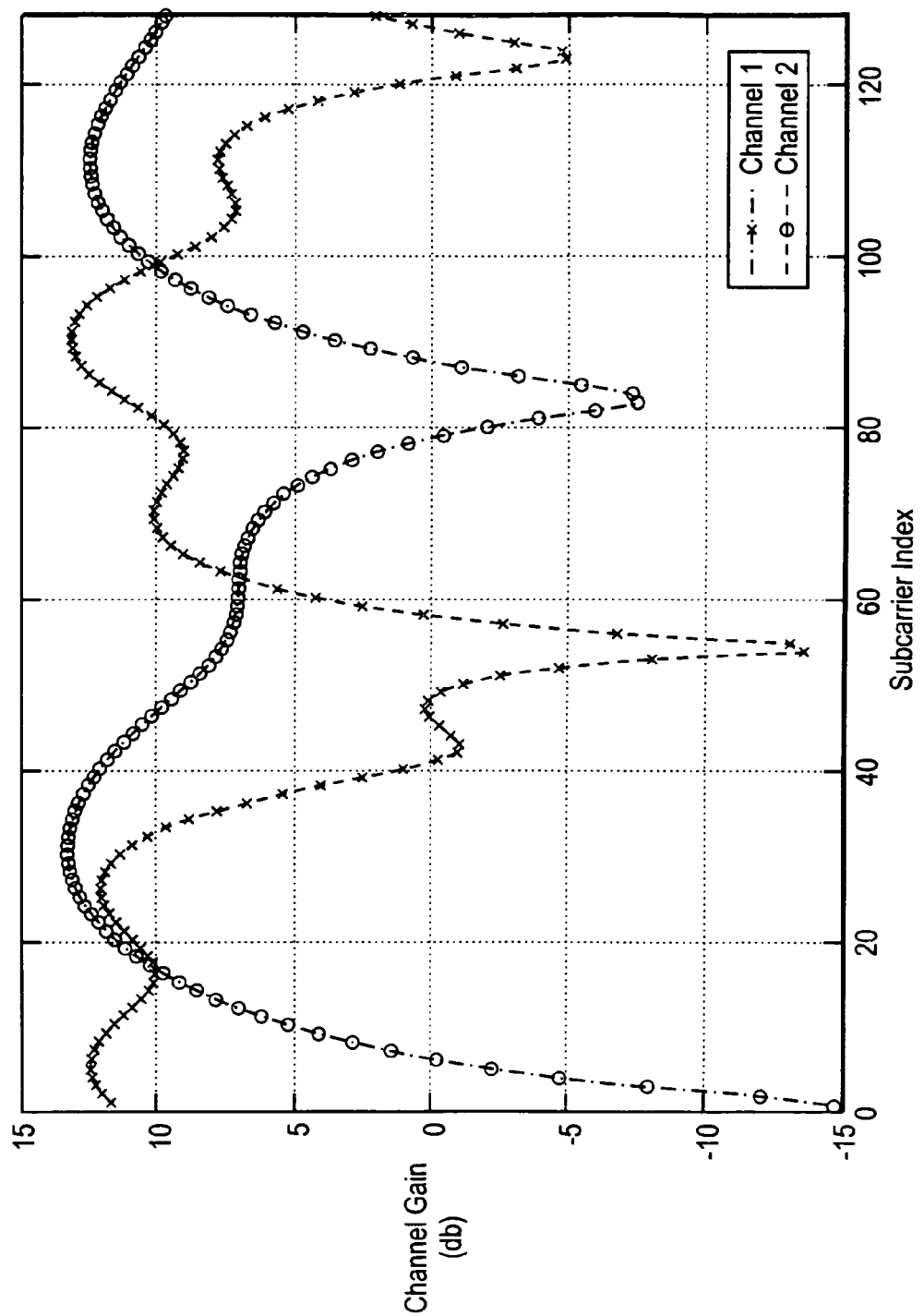
FIG. 2 shows different propagation conditions resulting in different channel responses in the frequency domain for different subscribers.
Figure 3:
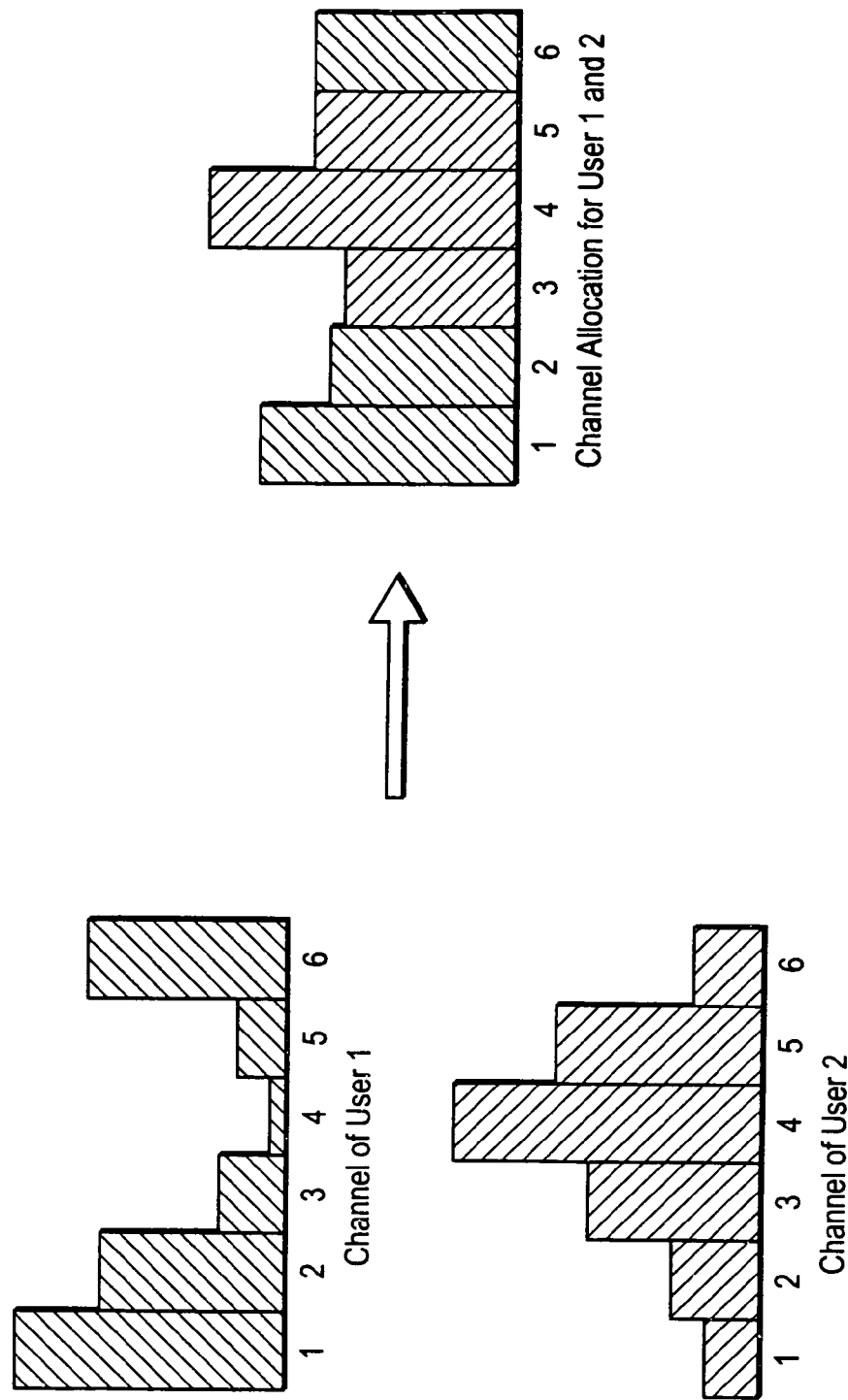
FIG. 3 shows an exemplary channel allocation of the OFDMA spectrum with joint channel assignment for a pair of users.

FIG. 2 illustrates that the channel gain for different channels changes based on the subcarrier being examined. For example, while channels 1 and 2 has good gain at certain subchannels, they also have poorer gains at others. The present invention makes intelligent decisions about channel assignments for multi-users so that multiple channels are jointly allocated to multiple subscribers based on which channels have desirable characteristics (e.g., higher gains, lower interference, etc.) for each particular subscriber. FIG. 3 illustrates the performance of multiple sub carriers (channels) for two users, user 1 and user 2, and the resulting allocation for those users based, at least in part, on the channel conditions.

Figure 4:
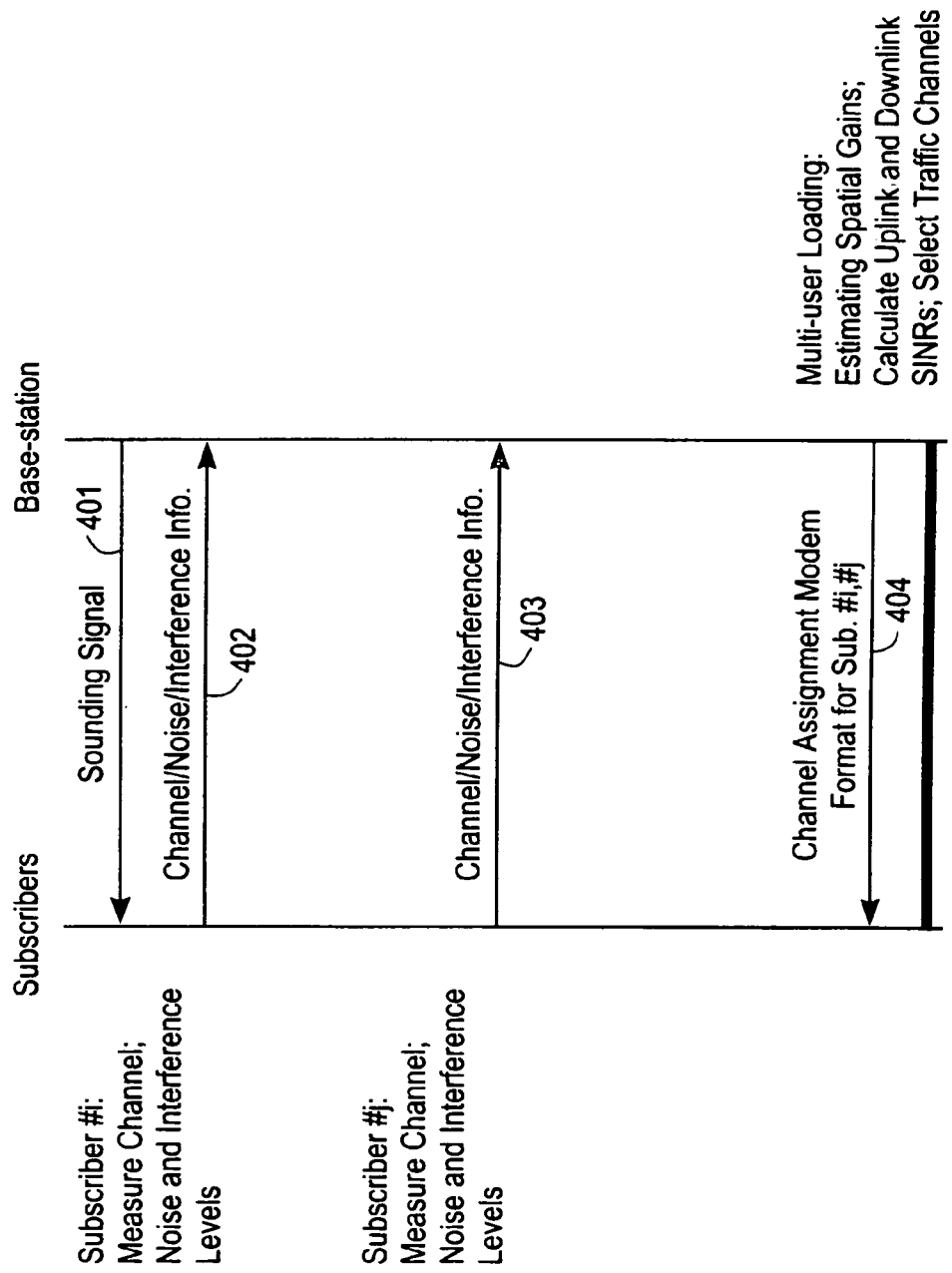
FIG. 4 is a flow diagram of one embodiment of a basic traffic channel assignment process between a base-station and multiple subscribers.

FIG. 4 illustrates one embodiment of an MAC protocol. Referring to FIG. 4, standby subscribers, e.g., subscriber #i, listens to an omni-directional sounding signal 401 broadcast from the base-station. In one embodiment, sounding signal 401 is transmitted periodically, and through all or a majority of OFDMA traffic channels. Based on the known sounding signal pattern, the subscriber estimates the channel gains at each of the OFDMA traffic channel. The subscriber also estimates the noise-plus-interference information in a similar fashion using signal processing techniques such as, for example, maximum likelihood channel and noise parameter estimation algorithms, FFT-based channel gain and noise-plus-interference power estimators, and decision directed channel estimation algorithms.

Until the subscriber has packets to transmit, or when it is paged by the base-station, the subscriber continues updating its channel and noise-plus-interference estimates based on new sounding signals received. Once paged or when it has packets to transmit, the subscriber encodes the estimated channel and noise-plus-interference information corresponding to all or a part of the OFDMA traffic channels into an access signal. The subscriber knows, prior to encoding, the OFDMA channels for which to encode information. The access signal is transmitted to the base-station through one or more access channels within a dedicated access time slot, such as with signal 402. Each access channel may consist of all OFDMA traffic channels or a subset of OFDMA traffic channels across the spectrum.

During this processing, other standby subscribers, e.g., subscriber #j, performs the same operations and may transmit another access signal, such as signal 403, through the same or different access channel to the base-station. In some cases, multiple access signals may collide on a particular access channel. The base-station may resolve both access signals using multi-user detection techniques well-known in the art.

Once the access signal(s) are received, the base-station estimates the uplink and downlink SINRs corresponding to the OFDMA traffic channels being allocated for accessing subscribers. If antenna arrays are employed at the base-station, accessing signals are also used for estimating uplink and downlink broadband spatial gains, which determine the uplink and downlink SINRs of OFDMA traffic channels.

The base-station then performs joint traffic channel assignment, based on subscribers' channel and noise-plus-interference characteristics, and broadband spatial gains provided that spatially separated antennas are employed at the base-station. Other factors, such as, for example, subscribers' data rates, time-off limitations, waiting time, buffer status, service type (voice, video, email, multi-media) and other QoS requirements, may be considered in conjunction with the channel and noise-plus-interference characteristics to perform joint traffic channel assignment. The decision is sent back, using signal 404, for example, to accessing and/or ongoing subscriber(s) at a predetermined time to initial or update wireless links. The determination of when to update the information and repeat the allocation process depends upon the mobility of the subscribers. For subscribers that move frequently, reallocation may occur more often.

Figure 5:
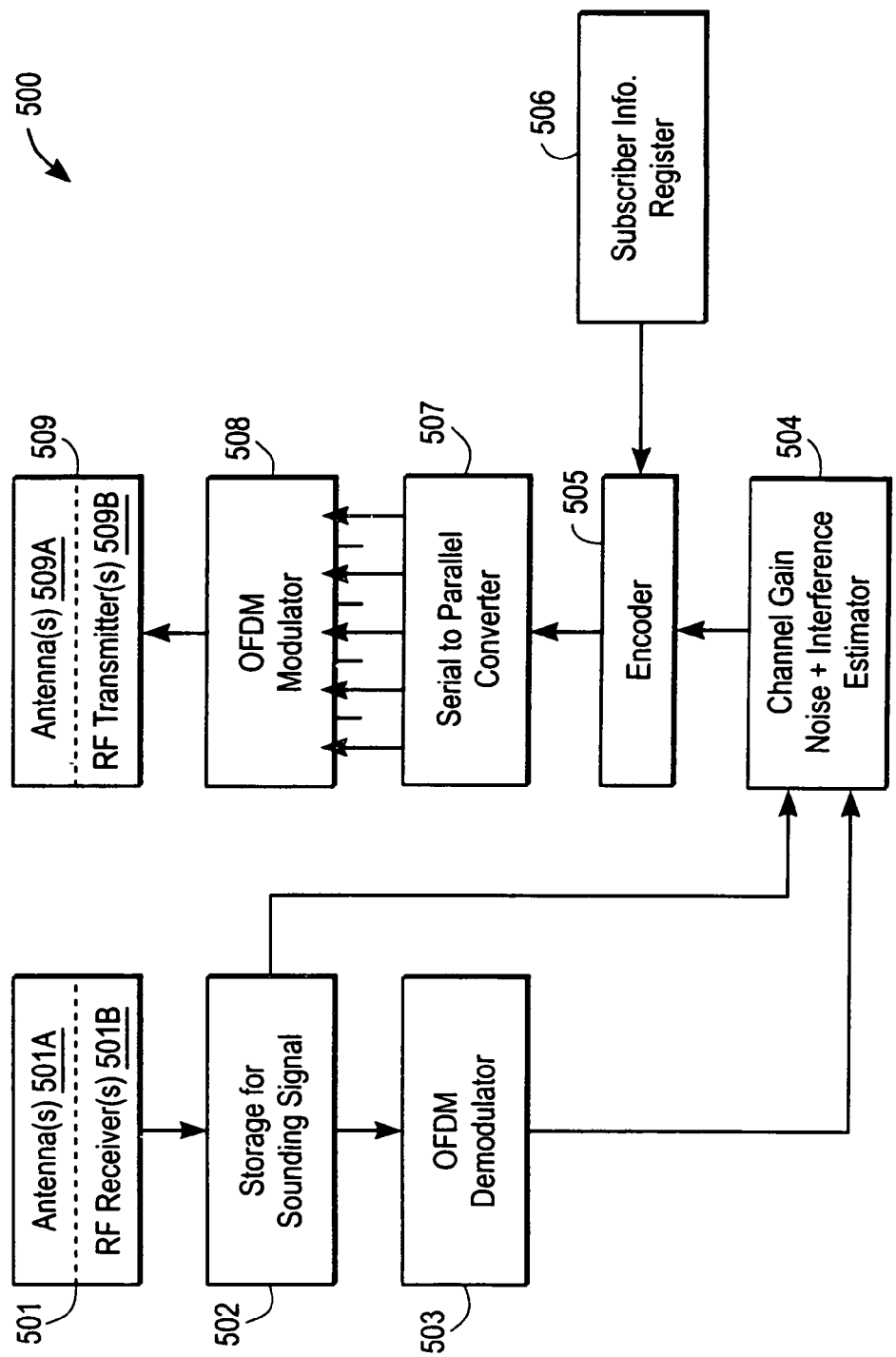
FIG. 5 is a block diagram of one embodiment of a subscriber.

FIG. 5 is a block diagram of one embodiment of a subscriber. Referring to FIG. 5, subscriber 500 comprises a receiving antenna (array) and RF receivers 501, storage 502 for received base-band sounding signal, an OFDM demodulator 503, a channel and noise-plus-interference estimator 504, a subscriber information register 506, an encoder 505, a serial-to-parallel converter 507, an OFDM modulator 508, RF transmitter(s) and transmission antenna(s) 509.

Sounding signals received at receiving antenna(s) 501A are down-converted to base-band by RF receiver(s) 501B. The down-converted sounding signals are stored in storage 502 for processing.

OFDM demodulator 503 demodulates data information embedded in the sounding signals. The demodulated information, along with the raw sounding signals stored, is forwarded to channel and noise-plus-interference estimator 504 for channel and noise-plus-interference estimation. Estimator 504 formats the estimated information into, for example, the signal-to-noise-plus-interference ratios, and together with the subscriber's information (e.g., subscriber ID information; requested data rate, etc.) from the subscriber information register 506, forwards the information to encoder 505.

Encoder 505 encodes the information and passes it to a serial to parallel converter 507, which converts the data from serial to parallel. The parallel data is then sent to OFDM modulator 508, which modulates the data. The output of OFDM modulator 508 forms an encoded accessing signal, which is then up-converted by the RF transmitter(s) 509A and transmitted out through the transmission antenna (array) 509B.

Figure 6:
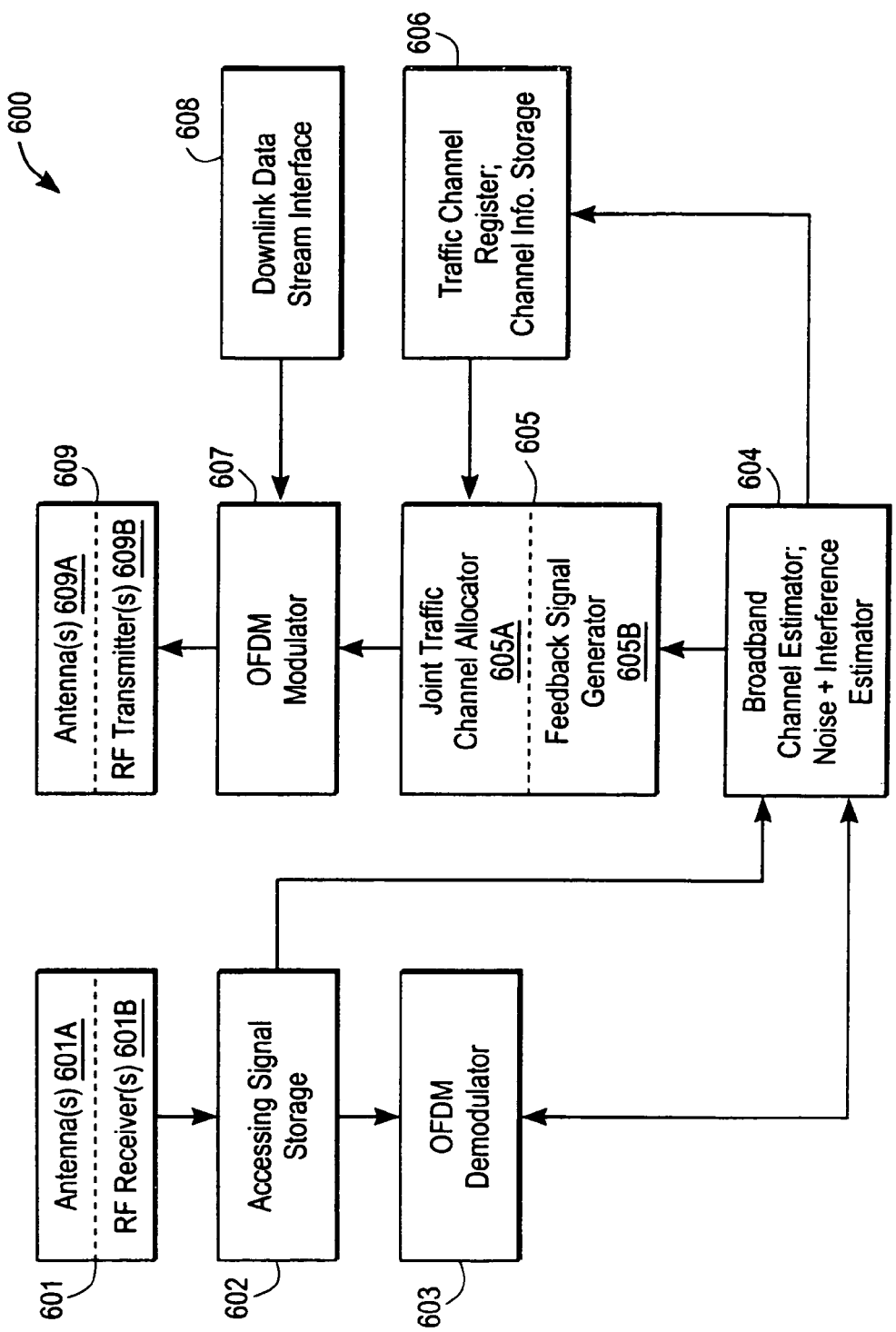
FIG. 6 is a block diagram of one embodiment of a base-station.

FIG. 6 is a block diagram of one embodiment of a base-station. Referring to FIG. 6, base-station 600 includes a receiving antenna (array) 601, storage 602 for uplink accessing signals, an OFDM demodulator 603, a broadband channel and noise-plus-interference estimator 604, a traffic channel register and storage 606 for estimated channel and noise-plus-interference characteristics, a joint traffic channel allocator 605A, a feedback signal generator 605B, a downlink data stream interface 608, an OFDM modulator 607, a RF transmitter (array) 609B and a transmitting antenna (array) 609A.

Uplink signals from subscribers, including accessing signals, are received by receiving antenna (array) 609A and down-converted to base-band by RF receiver(s) 609B. The accessing signals received during the dedicated access time slot are stored in storage 602. The row accessing signals are fed to a broadband channel and noise-plus-interference estimator 604, which, together with OFDM demodulator 603, estimates the broadband channel and noise-plus-interference characteristics and decodes the feedback information encoded in the accessing signals. In one embodiment, the feedback information includes, but is not limited to, downlink channel and noise-plus-interference characteristics under omni-directional transmission and the data rate requests and other QoS requirements of accessing subscribers. Such information, along with that for ongoing subscribers stored in the traffic channel register and broadband channel information storage 606, as forwarded to joint traffic channel allocator 605A for channel assignment. The results are coded into feedback message signals by feedback signal generator 605B. The feedback signals intended for accessing subscriber, and a portion or all ongoing subscribers, are mixed with downlink data streams for data designated for other subscribers from the downlink data streams interface 608 and modulated using OFDM modulator 607. The mixing may occur prior to OFDM modulator 607 using a mixing. The modulated OFDM signal is up-converted by RF transmitter(s) 609B and transmitted through antenna (array) 609A.

In one embodiment, a sounding signal generator 630 is also included in the base-station FIG. 6.

Uplink and Downlink Broadband Spatial Channel Estimation

Spatial processing (e.g., beamforming) using multiple antennas is among the most efficient ways to combat interference in wireless communications. When combined properly with joint traffic loading, uplink and downlink beamforming can significantly increase the capacity of an OFDMA network. To achieve such a gain, however, it is essential that the base-station has knowledge of "broadband" uplink and downlink spatial channel characteristics before performing spatially selective beamforming.

Figure 7:
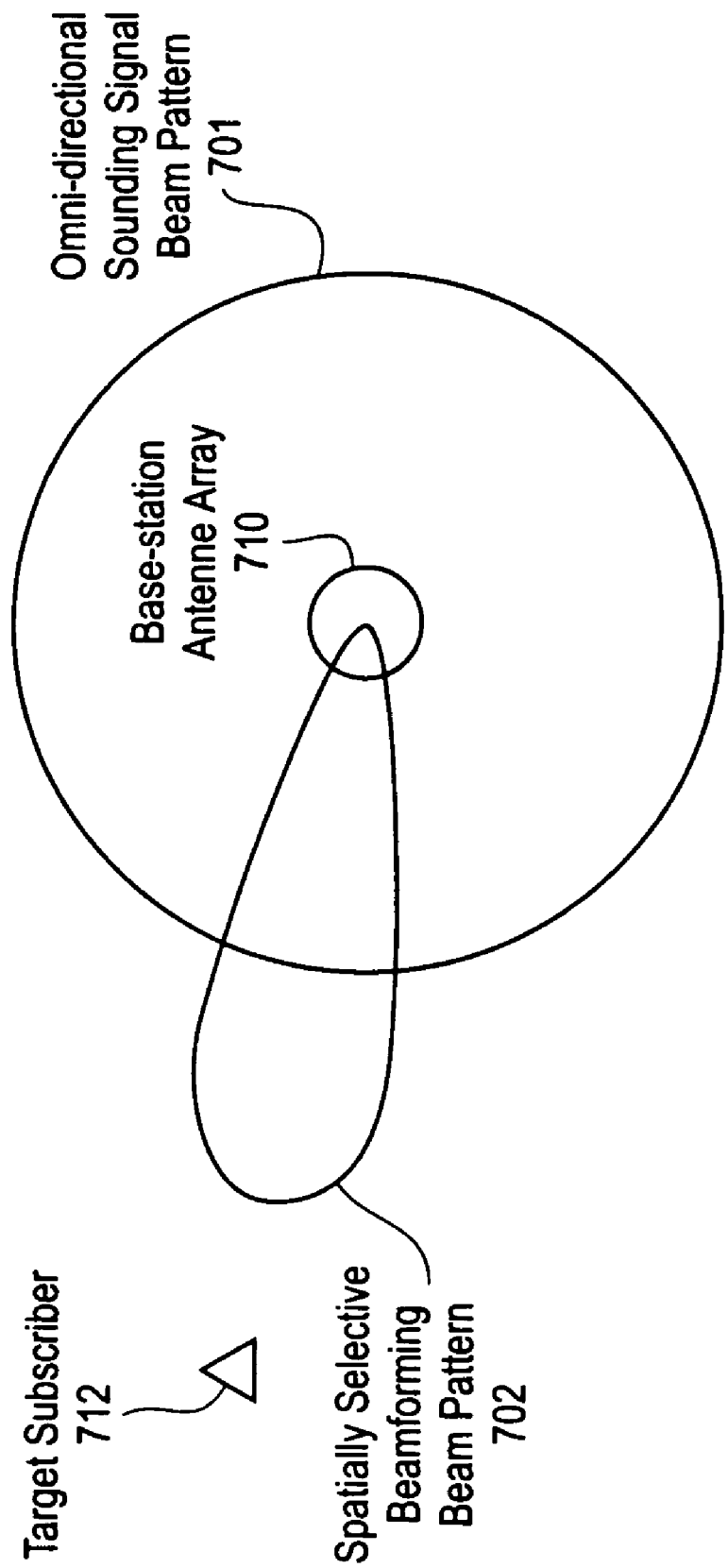
FIG. 7 shows the beam-pattern of omni-directional sounding signal and the beam-pattern of directional transmission and reception.

Before a link is established for a subscriber, the location or the spatial channel of the subscriber is unknown to the base-station, sounding signals can be broadcast omni-directionally from the base-station. Once the location of a subscriber has been determined, then the base-station may use beamforming to communicate with the subscriber. The difference between an omni-directional beam pattern and a spatial selective beam pattern is illustrated in FIG. 7. Referring to FIG. 7, an omni-directional sounding signal beam pattern 701 is shown being broadcast from base-station antenna array 710. Once target subscriber 712 communicates with the base-station, the base-station, using spatially selective beamforming beam pattern 702, which is created in a manner well-known in the art, may determine the channel characteristics and communicate thereafter with subscriber 712 (using beamforming). For this reason, OFDMA traffic channel conditions determined at the subscriber based on sounding signals does not reflect the actual traffic channel conditions if downlink beamforming is performed. In other words, a "bad" downlink traffic channel for omni-directional sounding signals may very well be a "good" channel for real data traffic with downlink beamforming.

In one embodiment, a base-station determines the downlink traffic channel conditions under spatial beamforming. Such a base-station may perform the following operations. First, a standby subscriber listens to the omni-directional sounding signal and determines the signal to noise-plus-interference ratio for each of the OFDMA traffic channels:

SINR_i, i=1, . . . , K, where SINR_i is the signal to noise-plus-interference ratio on the ith traffic channel, and K is the total number of traffic channels allowed by the base-station.

Once paged or when the standby subscriber has packets to transmit, the subscriber sends back the measured SINR information to the base-station though one of the access channels. A broadband spatial channel estimator at the base-station estimates the uplink spatial channels:

(a_1i, a_2i, . . . , a_Mi), i=1, . . . , K where a_ml is the antenna response of the ith traffic channel from the mth antenna, M is the total number of antenna elements.

Based on the spatial channel estimated, the base-station predicts the "additional" spatial gain of beamforming over omni-directional transmission as, for example, G_i=10 log 10(|a_1i|^2+|a_2i|^2+ . . . +|a_Mi|^2)/|a_1i+a_2i+ . . . +a_Mi|^2[dB], i=1, . . . , K.

Many other approaches can be used to estimate the spatial processing gains over omni-directional transmission. Once G_i is calculated, the expected SINR_i over traffic channel i with downlink beamforming can be determined as SINR_i,new=SINR_i+G_i, i=1, . . . , K The above information is used by the traffic channel allocator of the base-station to determine a channel assignment.

Figure 8:
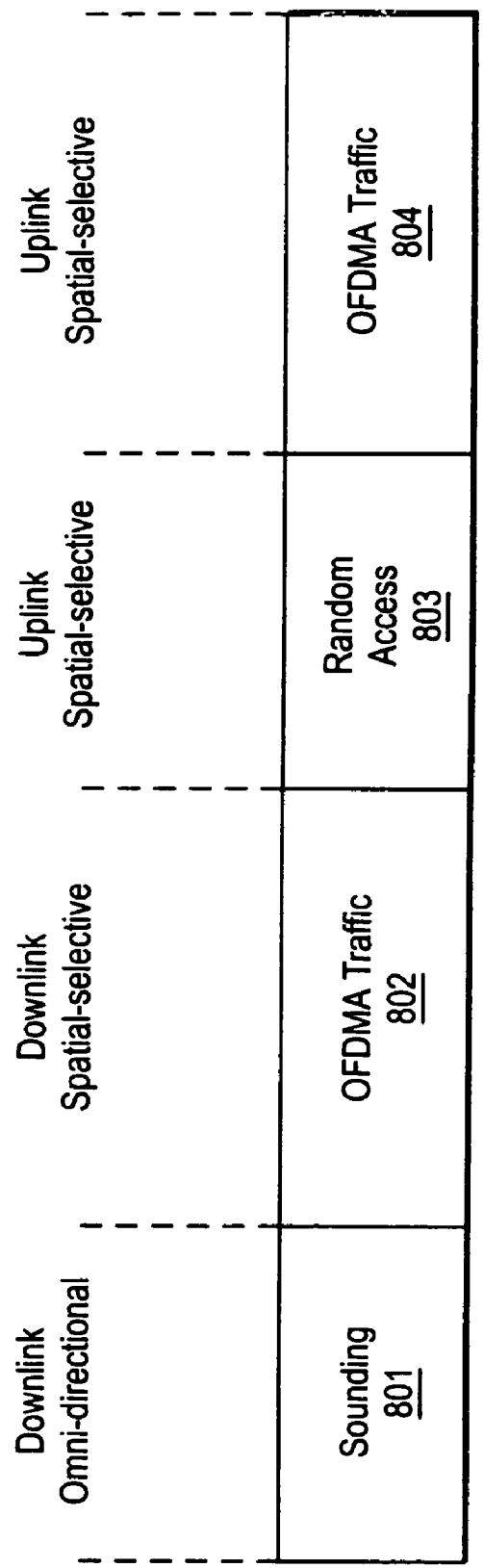
FIG. 8 shows an examplary frame structure for use during link initiation.

FIG. 8 illustrates and frame structure of a time-division duplex network where the above operations are performed before traffic channel assignment. Referring to FIG. 8, initially, omni-directional sounding signals are transmitted from the base-station (801). Downlink data streams are delivered in a spatially selectively fashion to ongoing subscribers using downlink beamforming (802). Thus, a portion of the downstream traffic (e.g., 5%, 10%, etc.) is dedicated to the transfer of information to facilitate the channel allocation process for new subscribers. Accessing subscribers listen to the sounding signal and send back the measured SINR_i of all available traffic channels through a dedicated access channel drawing a random access time period (803). The base-station estimates, based on the accessing signal and feedback SINR information, e.g., the SINR for accessing subscribers with downlink beamforming. After rate negotiation and initial hand-shaking, the accessing subscribers are assigned traffic channels through which data streams are transmitted with uplink and downlink beamforming. The uplink transfer of information (804) represents the remaining portion of the uplink time window.

Protocols for Multiple Base-Stations

One application of joint traffic channel assignment is multi-cell OFDMA networks. In such setup, the network capacity can benefit significantly from dynamic loading/adaptive modulation that increases, and potentially maximizes, the throughput in any given situation. Essentially, multiple cells can share the overall spectral resources and provide "on-demand" traffic channel allocation in a dynamic network.

Figure 9:
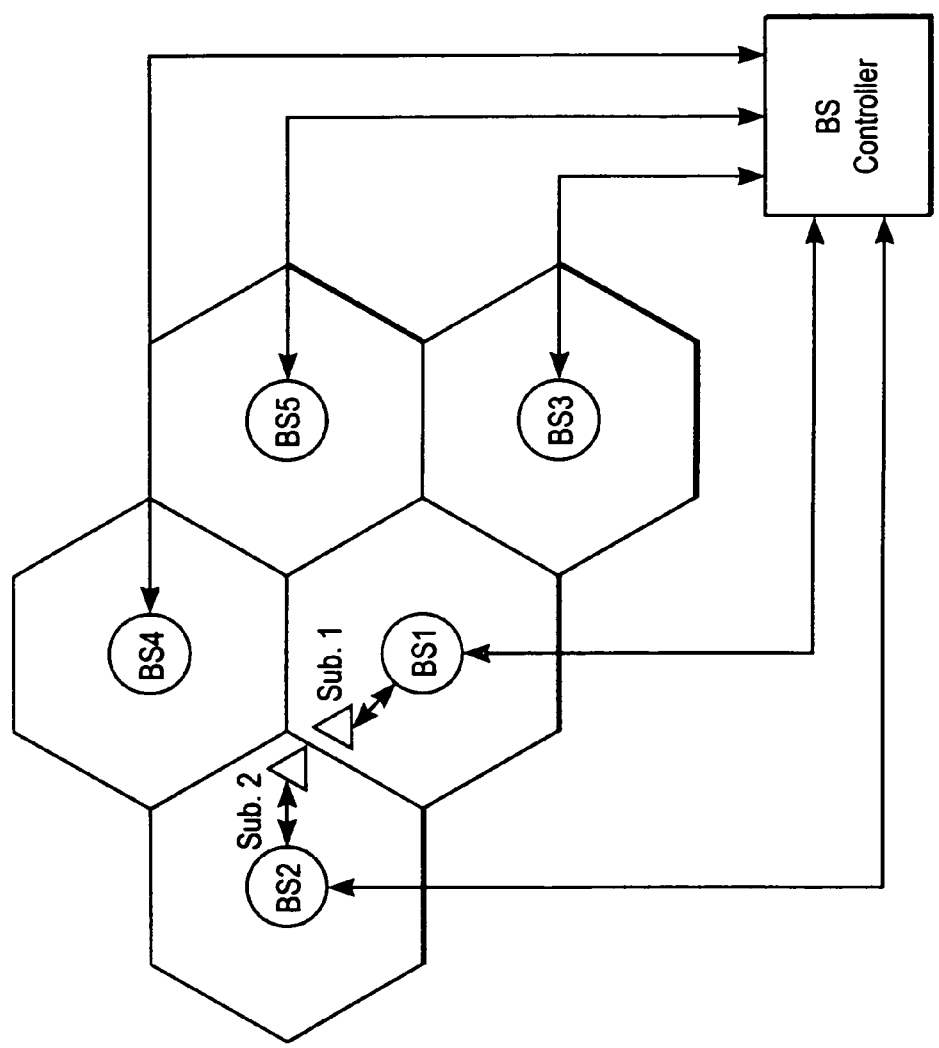
FIG. 9 shows base-stations in a multi-cell network to perform joint traffic channel allocation.

To enable joint multi-cell traffic channel allocation, the base-station within each cell performs uplink and downlink traffic channel estimation using the protocols and schemes described above. In addition, as illustrated in FIG. 9, neighboring base-stations exchange such information through the base-station controller, or dedicated links between base-stations. Traffic channel conditions, assignment tables, as well as QoS requirements of all accessing subscribers of neighboring cells, may be accounted for in performing traffic channel assignment. For example, if two base stations know two subscribers near to each other in different cells can be allocated any of channels 1–10 (there are channels with high gain for these subscribers), then one base station may allocate channels 1–5 to its subscriber and the other base station may allocate channels 6–10 to its subscriber.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A cellular network comprising:
   a plurality of subscribers each of said subscribers communicating with one base station of a plurality of base stations using orthogonal frequency division multiple access (OFDMA);
   each of said base stations having logic to coordinate multiple-access and information exchange between the base station and the plurality of subscribers, the logic selecting a set of OFDMA traffic channels from a plurality of candidate OFDMA traffic channels, based on feedback OFDMA channel information collected from the plurality of subscribers and OFDMA channel information collected from at least one of the other base stations, and in collaboration with said at least one other base station to provide joint OFDMA channel allocation to multiple ones of said plurality of subscribers.

2. The network defined in claim 1 wherein the logic calculates spatial gains of uplink and downlink channels based on responses of spatially separated receivers at the base station.

3. The network defined in claim 1 wherein the feedback information comprises channel fading information and noise and interference levels for each of the plurality of candidate OFDMA traffic channels.

4. The network defined in claim 1 wherein the plurality of subscribers send the feedback information in response to a sounding signal from each of one or more of the base stations.

5. The network defined in claim 1 wherein said logic selects a combination of modulation and coding schemes based on the SINR of the selected traffic channel for each accessing subscriber.

6. The network defined in claim 1 wherein the logic comprises medium access control (MAC) logic.

7. A method comprising:
   sending sounding signals to a plurality of subscribers from a plurality of base stations;
   receiving, at each base station, channel condition information for a plurality of OFDMA traffic channels from at least one of said subscribers and at least one other base station; and
   performing OFDMA multi-user traffic channel assignment to assign OFDMA traffic channels from the plurality of OFDMA traffic channels to the plurality of subscribers, based on the OFDMA channel condition information received from at least one of said subscribers and at least one other of said base stations and estimated spatial gains for the uplink and downlink signals for the plurality of subscribers, and in collaboration with said at least one other of said base stations to provide joint OFDMA channel allocation to multiple ones of said plurality of subscribers.

8. The method defined in claim 7 wherein the channel condition information comprises information regarding estimated channel gains and channel interference for the plurality of OFDMA traffic channels.

9. The method defined in claim 7 wherein performing traffic channel assignment is based on channel conditions between one or more antennas at a base station and one or more antennas at subscriber locations.

10. The method defined in claim 7 further comprising estimating spatial gains for uplink and downlink signals.

11. The method defined in claim 10 further comprising estimating signal-to-noise-plus-interference rates (SINRs) for the uplink and downlink signals, and wherein performing channel assignment is based on the SINRs for the uplink and downlink signals.

12. The method defined in claim 11 wherein estimating SINRs for the uplink and downlink signals is performed on all OFDMA traffic channels for all active and accessing subscribers.

13. The method defined in claim 11 wherein performing channel assignment is based on quality of service (QoS) requirements.

14. The method defined in claim 13 wherein the QoS requirements include one or more of the following: data rate, time-out, bit error rate, and writing time.

15. The method defined in claim 13 wherein performing channel assignment is based on priority.

16. The method defined in claim 7 further comprising determining a combination of coding and modulation schemes when performing channel assignments.

17. The method defined in claim 7 wherein performing traffic channel assignments comprises said plurality of base stations coordinating to perform the traffic channel assignment.

18. The method defined in claim 17 wherein each of the plurality of base stations is within a cell and estimates SINRs for uplink and downlink signals across all OFDMA traffic channels for accessing subscribers.

19. The method defined in claim 18 when the plurality of base stations perform estimates for active and accessing subscribers.

20. The method defined in claim 7 wherein the sounding signal is omni-directional.

21. The method defined in claim 7 wherein estimating spatial gains for uplink and downlink signals comprises:
    estimating broadband spatial channels across the plurality of OFDMA traffic channels for each accessing subscriber;
    determining the spatial processing gains for uplink and downlink signals on each of the plurality of OFDMA traffic channels;
    predicting signal-to-noise-plus-interference ratio (SINR) for uplink and downlink transmission with spatial processing over each of available OFDMA traffic channels by adding the spatial processing gain to downlink signal strength feedback from one or more subscribers.

22. A method comprising:
    receiving, at one of a plurality of base stations, OFDMA channel characteristics and noise-plus-interference information measured at spatially distributed subscribers;
    receiving OFDMA channel characteristics information for at least one other base station; and
    assigning OFDMA traffic channels for an OFDMA network, based on received OFDMA channel characteristics and noise-plus-interference information measured at the spatially distributed subscribers and the OFDMA channel characteristics information from the at least one other base station, and in collaboration with at least said one other base station to provide joint OFDMA channel allocation to multiple ones of said subscribers.

23. The method defined in claim 22 wherein assigning traffic channels is performed for the OFDMA network that uses spatial multiplexing.

24. A method comprising:
    each of a plurality of subscribers estimating channel gains and noise-plus-interference levels of a set of OFDMA traffic channels in response to a sounding signal;
    the plurality of subscribers transmitting to a first base station measured OFDMA channel and noise-plus-interference information;
    receiving, by one of said subscribers, an allocation of one or more OFDMA traffic channels allocated, in response to the measured channel and noise-plus-interference information and OFDMA channel information from a plurality of base stations including a second base station other than the first base station, and in collaboration with at least said second base station to provide joint OFDMA channel allocation to multiple ones of said plurality of subscribers;
    at least one of the plurality of subscribers transmitting packets using one or more allocated OFDMA traffic channels.

25. The method defined in claim 24 wherein the plurality of subscribers transmit the measured channel and noise-plus-interference information on pre-allocated channels.

26. The method defined in claim 24 wherein the plurality of subscribers transmits the measured channel and noise-plus-interference information when paged or when one or more of the plurality of subscribers have a packet to transmit to the first base station.

27. An apparatus comprising:
    an OFDMA channel and noise-plus-interference estimator;
    an access signal generator coupled to the estimator;
    an OFDM modem coupled to the generator; and
    a radio frequency transmitter to transmit information on OFDMA traffic channels jointly allocated to a plurality of subscribers through a collaborative OFDMA channel assignment among multiple base stations.

28. The apparatus defined in claim 27 wherein the estimator estimates channel gains and noise-plus-interference levels in a pre-determined set of traffic channels.

29. The apparatus defined in claim 28 wherein the generator encodes channel and noise-plus-interference information to form an access signal.

30. The apparatus defined in claim 29 wherein the OFDM modem modulates the access signal and transmits a modulated version of the access signal through an access channel.

31. The apparatus defined in claim 30 wherein the access channel comprises at least a subset of all traffic channels during and access time slot.

32. An apparatus comprising:
    at least one spatially separated transceiver;
    an access signal detector and demodulator coupled to the at least one spatially separated transceivers;
    a spatial channel and spatial gain estimator;
    an uplink and downlink signal-to-noise-plus-interference estimator;
    a multi-user traffic channel allocator coupled to said estimators to determine OFDMA channel assignment based on broadband spatial channel estimates and measured OFDMA channel and noise-plus-interference information feedback from subscribers and from at least two base stations to provide joint OFDM channel allocation to multiple subscribers; and
    an OFDM modem coupled to the allocator.

33. The apparatus defined in claim 32 wherein the allocator determines traffic channel assignment and a code and modulation combination for each accessing subscriber, and the OFDM modem modulates the traffic channel assignment and transmits a modulated version of the traffic channel assignment to at least one subscriber.

34. The apparatus defined in claim 32 wherein the broadband spatial channel estimates comprise the broadband spatial channel between a base station and each accessing subscriber.

35. The apparatus defined in 32 wherein the access signal detector and demodulator detects access signals transmitted by subscribers and demodulates the measured channel and noise-plus-interference information feedback from subscribers.

* * * * *